US011913280B2

(12) United States Patent

Lynch et al.

(10) Patent No.: US 11,913,280 B2
(45) Date of Patent: Feb. 27, 2024

(54) APPARATUSES FOR SEPARATING, CONTROLLING, AND DIRECTING LIFT CORDS OR LIFT CHAINS OF ARCHITECTURAL OPENING COVERINGS

(71) Applicant: SAFE-T-SHADE, INC., Huntersville, NC (US)

(72) Inventors: William Lynch, Cornelius, NC (US); Michael Barclift, Denver, NC (US)

(73) Assignee: Safe-T-Shade, Inc., Huntersville, NC (US)

( * ) Notice: Subject to any disclaimer, the term of this patent is extended or adjusted under 35 U.S.C. 154(b) by 0 days.

(21) Appl. No.: 18/321,157

(22) Filed: May 22, 2023

(65) Prior Publication Data

US 2023/0374855 A1 Nov. 23, 2023

Related U.S. Application Data

(60) Provisional application No. 63/344,707, filed on May 23, 2022.

(51) Int. Cl.
*E06B 9/326* (2006.01)

(52) U.S. Cl.
CPC .................................... *E06B 9/326* (2013.01)

(58) Field of Classification Search
CPC ....... E06B 9/326; E06B 9/78; E06B 2009/785
See application file for complete search history.

(56) References Cited

U.S. PATENT DOCUMENTS 3,123,182 A * 3/1964 Malone .................. A47H 11/02 188/65.1
4,878,269 A * 11/1989 Anscher ................ F16G 11/101 24/136 R
5,167,268 A * 12/1992 Mao ........................ E06B 9/322 188/65.1
5,465,779 A 11/1995 Rozon
(Continued)

FOREIGN PATENT DOCUMENTS

WO 2021096436 A1 5/2021

OTHER PUBLICATIONS

International Search Report and Written Opinion for International Patent Application No. PCT/US2023/23057, dated Aug. 15, 2023, 7 pages.

*Primary Examiner* — Johnnie A. Shablack
(74) *Attorney, Agent, or Firm* — Withrow + Terranova, PLLC; Vincent K. Gustafson

(57) ABSTRACT

An apparatus for separating, controlling, and directing a lift cord or lift chain of an architectural opening includes a body structure having first and second upper openings that are separated by an upper medial guide member that protrudes beyond the upper openings A rotatable wheel within a cavity of the body structure is configured to engage a lift cord or lift chain provided as a loop, wherein such engagement allows free passage of first and second segments of the loop through the cavity in opposing directions, while preventing free passage of the first and second segments through the cavity in the same direction. The apparatus may be coupled to a top end of a cord channel enclosure having a slider moveably engaged thereto to actuate the lift cord or lift chain, with a fixed length loop portion of lift cord or lift chain extending upward from the apparatus.

24 Claims, 13 Drawing Sheets

(56) References Cited

U.S. PATENT DOCUMENTS

| | | | | | |
|---|---|---|---|---|---|
| 5,595,232 | A | | 1/1997 | Benthin | |
| 5,752,558 | A | * | 5/1998 | Lin | E06B 9/326 160/320 |
| 5,845,696 | A | * | 12/1998 | Chou | E06B 9/36 160/321 |
| 5,850,863 | A | | 12/1998 | Huang | |
| 6,189,595 | B1 | * | 2/2001 | Lee | E06B 9/303 160/173 R |
| 6,516,860 | B1 | | 2/2003 | Weaver et al. | |
| 7,204,292 | B2 | | 4/2007 | Nien | |
| 7,353,857 | B2 | * | 4/2008 | Koop | E06B 9/324 24/116 A |
| 7,931,069 | B2 | * | 4/2011 | Cannaverde | E06B 9/322 474/171 |
| 8,286,686 | B2 | * | 10/2012 | Cannaverde | E06B 9/326 160/320 |
| 8,544,525 | B2 | * | 10/2013 | Zhu | E06B 9/56 160/321 |
| 8,662,136 | B2 | * | 3/2014 | Nevins | E06B 9/42 160/173 R |
| 8,763,671 | B2 | * | 7/2014 | Vestal | E06B 9/262 160/84.01 |
| 8,763,675 | B2 | | 7/2014 | Zhu | |
| 8,931,538 | B2 | * | 1/2015 | Ho | E06B 9/326 160/168.1 R |
| 8,950,463 | B2 | | 2/2015 | Vestal et al. | |
| 8,967,226 | B2 | * | 3/2015 | Vestal | E06B 9/326 160/321 |
| 9,038,696 | B2 | | 5/2015 | Lava et al. | |
| 9,045,934 | B1 | | 6/2015 | Lynch et al. | |
| 9,151,110 | B2 | | 10/2015 | Vestal et al. | |
| 9,506,290 | B2 | | 11/2016 | Lin | |
| 9,540,872 | B2 | * | 1/2017 | Gramsch | E06B 9/368 |
| 10,006,245 | B1 | * | 6/2018 | Marocco | E06B 9/78 |
| 10,208,535 | B2 | * | 2/2019 | Marocco | E06B 9/78 |
| 10,329,840 | B2 | * | 6/2019 | Diamond | E06B 9/322 |
| 10,774,583 | B1 | * | 9/2020 | Chuang | E06B 9/78 |
| 10,968,692 | B2 | * | 4/2021 | Marocco | E06B 9/78 |
| 11,098,528 | B2 | * | 8/2021 | Smith | E06B 9/326 |
| 11,105,149 | B2 | * | 8/2021 | Marocco | E06B 9/78 |
| 11,142,945 | B2 | * | 10/2021 | Marocco | F16H 7/18 |
| 11,236,546 | B2 | * | 2/2022 | Zhang | E06B 9/60 |
| 11,236,547 | B2 | * | 2/2022 | Graham | E06B 9/78 |
| 11,492,843 | B2 | * | 11/2022 | Marocco | E06B 9/78 |
| 2011/0247768 | A1 | * | 10/2011 | Kwak | E06B 9/326 160/319 |
| 2012/0017399 | A1 | * | 1/2012 | Huang | E06B 9/42 24/115 F |
| 2016/0069131 | A1 | | 3/2016 | Gramsch | |
| 2017/0145744 | A1 | | 5/2017 | Diamond | |
| 2018/0238109 | A1 | * | 8/2018 | Kanargelidis | E06B 9/326 |
| 2019/0195014 | A1 | * | 6/2019 | Chua | E06B 9/42 |
| 2019/0264501 | A1 | * | 8/2019 | Marocco | E06B 9/42 |
| 2019/0264503 | A1 | * | 8/2019 | Marocco | F16H 57/035 |
| 2020/0032582 | A1 | | 1/2020 | Graham et al. | |
| 2021/0003475 | A1 | * | 1/2021 | Kim | G01M 99/001 |
| 2021/0088107 | A1 | | 3/2021 | Nanbu et al. | |
| 2023/0057794 | A1 | * | 2/2023 | Marocco | E06B 9/78 |
| 2023/0235626 | A1 | * | 7/2023 | Barkun | E06B 9/326 24/116 R |
| 2023/0265713 | A1 | * | 8/2023 | Krantz-Lilienthal | E06B 9/78 160/127 |

* cited by examiner

APPARATUSES FOR SEPARATING, CONTROLLING, AND DIRECTING LIFT CORDS OR LIFT CHAINS OF ARCHITECTURAL OPENING COVERINGS

CROSS-REFERENCE TO RELATED APPLICATIONS

The present application claims priority to U.S. Provisional Patent Application No. 63/344,707, entitled "Devices and Systems for Directing and Separating and Controlling Dual Directional Cords and Chains Used to Safely Lift and Lower Architectural Opening Coverings," filed on May 23, 2022, wherein the entire contents of the foregoing application are hereby incorporated by reference herein.

TECHNICAL FIELD

This disclosure relates to apparatuses for operating cords and chains used to lift and lower for coverings for architectural openings. In particular, an apparatus is disclosed for use at the top of a cord channel enclosure, with the apparatus permitting a lift cord or lift chain to be smoothly guided into the cord channel enclosure over a variety of cord channel positions and operating conditions (including twisting of the lift cord or lift chain above the enclosure), while preventing slack in the lift cord or lift chain within the cord channel enclosure and thereby eliminating any possibility that a hazardous loop of lift cord or lift chain could protrude from the cord channel enclosure.

BACKGROUND

In the use of window and architectural passage coverings, the art has long relied on cords, string, bead chains, or the like to extend and retract the coverings. Such coverings take many forms, including shades such as curtains, roll-up shades, Venetian blinds, vertical blinds, cellular shades, and the like. One problem with such coverings that rely on cords is that small children can become entangled in the cords and experience serious harm, including strangulation and death. On Nov. 2, 2022, the U.S. Consumer Product Safety Commission (CPSC) approved a new federal safety standard for custom architectural (e.g., window and door) coverings to prevent deaths and serious injuries from strangulation. As noted in a CPSC press release, young children can quickly and silently become strangled on accessible cords forming a loop having an opening of 16 or more inches on window coverings, and an average of about nine children under five years of age die every year from strangling in window blinds, shades, draperies, and other window coverings with cords.

The CPSC final rule requires that operating cords on custom window coverings meet the same requirements as those for operating cords on stock window coverings, as provided in section 4.3.1 of ANSI/WCMA-2018. If a window covering has an operating cord that can form a loop having an opening of 16 or more inches, ANSI/WCMA-2018 requires that the cord must be inaccessible to children. One known method to render operating cords inaccessible is to contain them in a rigid cord shroud, which allows a user to use operating cords while limiting access to such cords. Such rigid cord shrouds need to be operable behind obstructions (e.g., when furniture is disposed between a user and an architectural covering), and also be accessible to, and operable by, people with disabilities. One type of known rigid cord shroud is disclosed in U.S. Pat. No. 8,950,463 to Vestal et al. (wherein the disclosure of such patent is hereby incorporated by reference herein), which provides a shroud that is hingedly attached to a clutch assembly that drives a roller to operate a cover for an architectural opening. The hinged attachment enhances user access to the rigid cord shroud, but is tiltable in only one plane, and is not readily adapted to being retrofitted to generic clutches of various manufacturers.

Other conventional rigid cord shrouds lacking integral hinges may be operably connected to generic clutches via a looped lift cord or lift chain. While this arrangement may provide further enhanced user accessibility, since the rigid cord shroud may swivel along multiple planes relative to the clutch, the increased degrees of freedom gives rise to new problems such as twisting and binding of lift cords or lift chains if the rigid cord shroud should be rotated about its longitudinal axis by a user. Such twisting and binding of lift cords or lift chains may inhibit smooth operation of a rigid cord shroud, or even render a rigid cord shroud inoperative. Moreover, it may be challenging to maintain slack in a looped lift cord or lift chain between a rigid cord shroud and a clutch assembly sufficient to enable swiveling therebetween, while simultaneously maintaining sufficient tension within the rigid cord shroud in order to prevent any portion of the lift cord or lift chain from being removed from an open channel of the rigid cord shroud, which would present a safety hazard.

Need therefore exists in the art for improved apparatuses for separating, controlling, and directing lift cords or lift chains of architectural opening coverings to address the above-described limitations.

SUMMARY

An apparatus for separating, controlling, and directing a lift cord or lift chain of an architectural opening includes a body structure having first and second upper openings that are separated by an upper medial guide member that protrudes beyond the first and second upper openings, wherein the upper medial guide member maintains a degree of separation between the upper openings that limits binding of a lift cord or lift chain being fed into or out of the body structure. The body structure has an internal cavity and a spindle on which a wheel is configured to rotate within the cavity, with the wheel being configured to engage the lift cord or lift chain. The lift cord or lift chain is provided as a loop including a first segment configured to travel through the first upper opening and a second segment configured to travel through the second upper opening. Engagement between the wheel and the loop of the lift cord is configured to allow free passage of the first and second segments through the cavity in opposing directions, and configured to prevent free passage of the first and second segments through the cavity in the same direction. The internal cavity may include tapered first and second upper passages leading to the first and second upper openings, with the passages each having a greater width proximate to the corresponding upper openings than at a central portion of the cavity containing the wheel, wherein the increased width upper openings and tapered upper passages may reduce binding of a lift cord or lift chain being fed into the upper passages in a direction departing from a central axis of each passage.

In one aspect, the disclosure relates to an apparatus for separating, controlling, and directing a lift cord or lift chain of an architectural opening covering, the apparatus comprising a primary body structure including first and second complementary body portions and containing a rotatable wheel configured to engage the lift cord or lift chain, the lift cord or lift chain being configured as a loop. The primary body structure defines first and second upper openings separated by an upper medial guide member that protrudes upwardly beyond the first and second upper openings, the primary body structure comprises an internal cavity, and the primary body structure comprises a lower opening, wherein the lower opening as well as the first and second upper openings are configured to permit passage of the lift cord or lift chain into and through the cavity. The loop of lift cord or lift chain comprises a first segment configured to travel through the first upper opening, and comprises a second segment configured to travel through the second upper opening. Engagement between the wheel and loop of the lift cord or lift chain is configured to allow free passage of the first and second segments through the cavity in opposing directions, and is configured to prevent free passage of the first and second segments through the cavity in the same direction.

In certain embodiments, the internal cavity comprises a first upper passage arranged between the central portion and the first upper opening, the first upper passage having a first upper end coinciding with the first upper opening and having a first lower end proximate to the central portion, the first passage having a greater width at the first upper end than at the first lower end; and the internal cavity comprises a second upper passage arranged between the central portion and the second upper opening, the second upper passage having a second upper end coinciding with the second upper opening and having a second lower end proximate to the central portion, the second passage having a greater width at the second upper end than at the second lower end.

In certain embodiments, each of the first upper passage and the second upper passage comprises a frustoconical shape.

In certain embodiments, the width of the first upper passage is at least 10% (or at least 20%, 30%, 40%, 50%, 60%, 80%, or 100%) greater at the first upper end than at the first lower end; and the width of the second upper passage is at least 10% (or at least 20%, 30%, 40%, 50%, 60%, 80%, or 100%) greater at the second upper end than at the second lower end.

In certain embodiments, the width of the first upper passage at the first upper end is at least 10% (or at least 20%, 30%, 40%, 50%, 60%, 80%, or 100%) greater than a maximum width of loop of lift cord or lift chain; and the width of the second upper passage at the first upper end is at least 10% (or at least 20%, 30%, 40%, 50%, 60%, 80%, or 100%) greater than a maximum width of loop of lift cord or lift chain.

In certain embodiments, the lift cord or lift chain comprises a bead chain; and the wheel comprises a plurality of recesses, wherein each recess of the plurality of recesses is configured to receive a corresponding individual bead of the bead chain.

In certain embodiments, the lift cord or lift chain comprises a straight cord; and the wheel comprises at least one recess configured to grasp the straight cord.

In certain embodiments, the upper medial guide member comprises a width that decreases with distance away from the first and second upper openings.

In certain embodiments, the upper medial guide member protrudes upwardly beyond the first and second upper openings by a distance at least as large as a width of either one of the first upper opening or the second upper opening.

In certain embodiments, the upper medial guide member protrudes upwardly beyond the first and second upper openings by a distance of at least 2 mm.

In certain embodiments, the primary body structure comprises a spindle on which the wheel is configured to rotate, the spindle being arranged in a central portion of the internal cavity, and the spindle being oriented non-parallel to a direction of travel of lift cord or lift chain within the primary body structure.

In certain embodiments, the spindle comprises a bore configured to receive a connector arranged to join the first and second complementary body portions to one another.

In certain embodiments, the first complementary body portion defines a first portion of the upper medial guide member, and the second complementary body portion defines a second portion of the upper medial guide member.

In certain embodiments, the primary body structure further comprises a lower medial guide member arranged between the central portion of the internal cavity and the lower opening, wherein the lower medial guide member locally separates the internal cavity into two laterally separated lower passages.

In certain embodiments, the two laterally separated lower passages each have a width that increases with distance away from central portion of the internal cavity.

In certain embodiments, the first complementary body portion defines a first portion of the lower medial guide member, and the second complementary body portion defines a second portion of the lower medial guide member.

In certain embodiments, a lower portion of the primary body structure comprises a tubular body portion.

In certain embodiments, each of the first and second complementary body portions is integrally formed from a polymeric material.

In certain embodiments, the apparatus further comprises: a cord channel enclosure coupled to a lower end of the primary body structure and comprising an open slot, wherein the loop of lift cord or lift chain is further configured to travel through an interior of the cord channel enclosure; a slider moveably engaged to the cord channel enclosure via the open slot and coupled to the loop of lift cord or lift chain, wherein movement of the slider facilitates movement of the first and second segments through the cord channel enclosure and through the cavity of the primary body structure; and an end guide structure coupled to a lower end of the cord channel enclosure, the end guide structure comprising a U-shaped channel through which the loop of lift cord or lift chain is configured to travel for passage to and from the cord channel enclosure.

In certain embodiments, the loop of lift cord or lift chain is continuous.

In certain embodiments, an upper portion of the continuous loop of lift cord or lift chain forms a fixed length subloop extending above the first and second upper openings; a lower portion of the continuous loop of lift cord or lift chain extends through the primary body structure, the cord channel enclosure, and the end guide structure; and the lower portion of the continuous loop or of lift cord or lift chain is tensioned by the wheel to prevent removal of the lift cord or lift chain through the open slot of the cord channel enclosure.

In certain embodiments, the fixed length subloop is configured to engage a clutch assembly couplable to a roller of the architectural opening covering.

In certain embodiments, the loop of lift cord or lift chain is discontinuous and comprises two ends joined to a clutch assembly, a roller, or other moveable member of configured to move the architectural opening covering.

In another aspect, any two or more features of aspects and/or embodiments disclosed herein may be combined for additional advantage.

Additional features and advantages will be set forth in the detailed description. It is to be understood that the foregoing summary, the following detailed description, and the accompanying drawings are merely exemplary and intended to provide an overview or framework to understand the nature and character of the claims.

DETAILED DESCRIPTION

The present disclosure relates generally to an apparatus for separating, controlling, and directing a lift cord or lift chain of an architectural opening includes a body structure having first and second upper openings that are separated by an upper medial guide member that protrudes beyond the upper openings. A rotatable wheel is provided (e.g., on a spindle) within a cavity of the body structure and is configured to engage a lift cord or lift chain provided as a loop, wherein such engagement allows free passage of first and second segments of the loop through the cavity in opposing directions, while preventing free passage of the first and second segments through the cavity in the same direction. The apparatus may be coupled to a top end of a cord channel enclosure having a slider moveably engaged thereto to actuate the lift cord or lift chain, with a fixed length loop portion of lift cord or lift chain extending upward from the apparatus.

Figure 1:
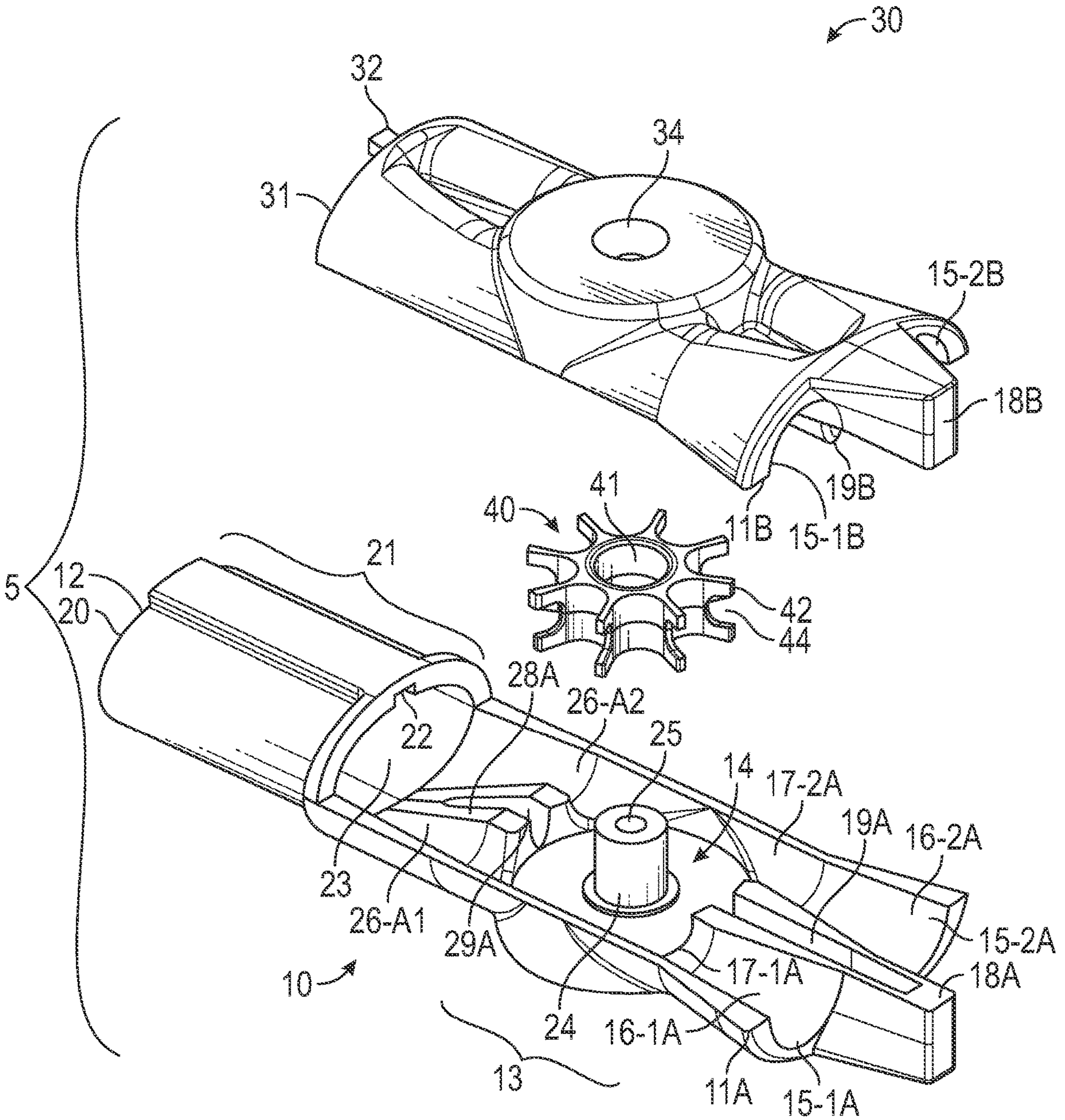
FIG. 1 is a first exploded perspective view of an apparatus for separating, controlling, and directing a lift cord of an architectural opening covering according to an embodiment of the present disclosure, showing first and second complementary body portions and a wheel arranged therebetween, with the wheel being configured to engage a lift cord or lift chain.
Figure 2:
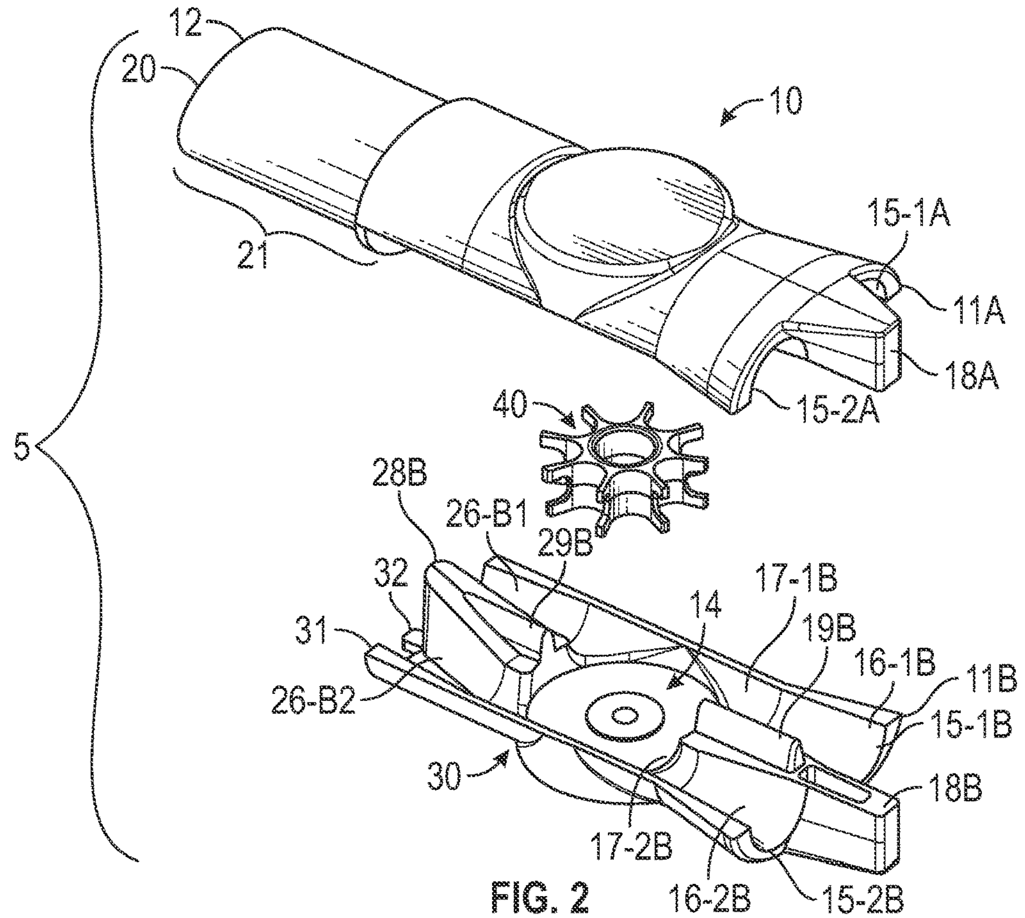
FIG. 2 is a second exploded perspective view of the apparatus of FIG. 1, flipped upside-down relative to the view shown in FIG. 1.
Figure 3:
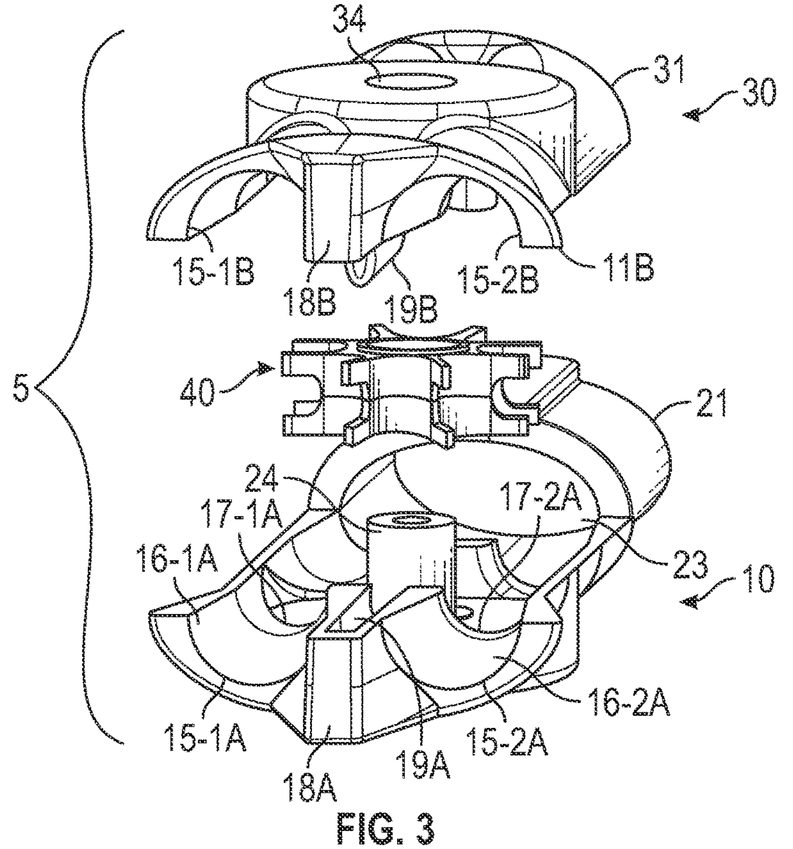
FIG. 3 is a third exploded perspective view of the apparatus of FIG. 1, showing top portions of the apparatus in the foreground.

FIGS. 1-3 provide exploded perspective views of an apparatus 5 for separating, controlling, and directing a lift cord of an architectural opening covering according to an embodiment of the present disclosure. The apparatus 5 includes a first complementary body portion 10 and a second complementary body portion 30 (that in combination form a primary body structure), as well as a wheel 40 configured to rotate about a spindle 24 arranged in a cavity 14 bounded in part by central body portion 13 of the first complementary body portion 10. The first complementary body portion 10 has an upper end 11A, a tubular lower portion 21, and a lower end 12, while the second complementary body portion 30 has an upper end 11B and a lower medial end 31. The lower end 12 of the first complementary body portion 10 defines a lower opening 20 arranged at a lower end of a tubular lower passage 23, wherein both the lower opening 20 and the tubular lower passage 23 optionally may have an oval, round, regular polygonal, rounded polygonal, or other curved or angular cross-sectional shape.

The upper end 11A of the first complementary body portion 10 has first and second upper opening portions 15-1A, 15-2A that are separated by an upper medial guide member portion 18A having a central recess 19A. The first complementary body portion also defines first and second upper passage portions 16-1A, 16-2A that extend from first and second upper ends (coinciding with the first and second upper opening portions 15-1A, 15-1B) to first and second lower ends 17-1A, 17-2A, with the passage portions 16-1A, 16-2A being wider at the upper ends (i.e., 15-1A, 15-2A) than at the lower ends 17-1A, 17-2A. The first complementary body portion 10 further defines a lower medial guide member portion 28A (with a central recess 29A) that locally separates the internal cavity 14 into first and second lower cavity portions 26A-1, 26A-2, and that is arranged between the spindle 24 and the tubular lower portion 21.

In a manner similar to the first complementary body portion 10, the upper end 11B of the second complementary body portion 30 has first and second upper opening portions 15-1B, 15-2B that are separated by an upper medial guide member portion 18B having a central protrusion 19B, with the second complementary body portion 30 also defining first and second upper passage portions 16-1B, 16-2B that extend from first and second upper ends (coinciding with the first and second upper opening portions 15-1B, 15-2B) to first and second lower ends 17-1B, 17-2B, with the upper passage portions 16-1B, 16-2B being wider at the upper ends (i.e., 15-1B, 15-2B) than at the lower ends 17-1B, 17-2B thereof. The second complementary body portion 30 also defines a lower medial guide member portion 28B (with a central protrusion 29B) that locally separates the internal cavity 14 into first and second lower cavity portions 26A-1, 26A-2, and that is arranged between a central portion 13 of the cavity 14 and the lower medial end 31.

The first and second upper opening portions 15-1A, 15-2A of the first complementary body portion 10 cooperate with the first and second upper opening portions 15-1B, 15-2B of the second complementary body portion 30 to form first and second upper openings of the body structure. Similarly, the first and second upper passage portions 16-1A, 16-1B and 16-2A, 16-2B of the respective first and second complementary body portions 10, 30 cooperate to form first and second upper passages of the body structure. In certain embodiments, the first and second upper passages may be frustoconical in shape. In certain embodiments, the width of the first upper passage is at least 10% (or at least 20%, 30%, 40%, 50%, 60%, 80%, or 100%) greater at the first upper end (e.g., 15-1A, 15-1B) than at the first lower end (e.g., 17-1A, 17-1B); and the width of the second upper passage is at least 10% (or at least 20%, 30%, 40%, 50%, 60%, 80%, or 100%) greater at the second upper end (e.g., 15-1B, 15-2B) than at the second lower end (e.g., 17-2A, 17-2B). In certain embodiments, the width of the first upper passage at the first upper end is at least 10% (or at least 20%, 30%, 40%, 50%, 60%, 80%, or 100%) greater than a maximum width of a loop of a lift cord or lift chain received by the body structure, and the width of the second upper passage at the first upper end is at least 10% (or at least 20%, 30%, 40%, 50%, 60%, 80%, or 100%) greater than a maximum width of loop of lift cord or lift chain.

The upper medial guide member portions 18A, 18B, which are configured to be joined together by engagement between the central protrusion 19B and the central recess 19A, cooperate to form an upper medial guide member of the body structure. As shown, the upper medial guide member (composed of upper medial guide member portions 18A, 18B) extends upward beyond the first and second upper openings (composed of opening portions 15-1A, 15-1B and 15-2A, 15-2B) and may comprise a tapered width that is reduced with increasing distance away from the first and second upper openings. In certain embodiments, the upper medial guide member protrudes upwardly beyond the first and second upper openings by a distance at least as large as a width of either one of the first upper opening or the second upper opening. In certain embodiments, the upper medial guide member protrudes upwardly beyond the first and second upper openings by a distance of at least 2 mm, at least 4 mm, at least 6 mm, at least 8 mm, at least 1 cm, at least 1.2 cm, or at least 1.5 cm, wherein any of the foregoing lower thresholds may optionally be bounded by any of the other values as an upper threshold. The lower medial guide member portions 28A, 28B, which are configured to be joined together by engagement between the central protrusion 29B and the central recess 29A, cooperate to form a lower medial guide member of the body structure. The first and second lower passage portions 26-1A, 26-1B and 26-2A, 26-2B of the respective first and second complementary body portions 10, 30 cooperate to form first and second lower passages (or lower cavity portions) that lead to the tubular lower passage 23 and lower opening 20 of the body structure. In certain embodiments, the first and second lower passages each have a width that increases with distance away from the central portion 13 of the internal cavity 14. The lower opening 20 as well as the first and second upper openings (composed of upper opening portions 15-1A, 15-1B and 15-2A, 15-2B) and the lower opening 20, together with the first and second upper passages (composed of upper passage portions 16-1A, 16-1B and 16-2A, 16-2B) and the first and second lower passages (composed of lower passage portions 26-1A, 26-1B and 26-2A, 26-2B), are configured to permit passage of a lift cord or lift chain (e.g., shown in FIGS. 5 and 6A-6D) into and through the cavity 14 to engage the wheel 40.

The second complementary body portion 30 comprises a lower tab 32 configured to engage a slot 22 along an inner surface of the tubular lower portion 21. The spindle 24 comprises a bore 25 that is configured to cooperate with a bore 34 defined in the second complementary body portion 30 to receive a connector (e.g., a screw, a rivet, or the like) to promote coupling engagement between the first and second complementary body portions 10, 30.

The spindle 24 is oriented non-parallel (e.g., perpendicular) to a direction of travel of a lift cord or lift chain through the first and second lower passages (composed of the first and second lower passage portions 26-1A, 26-1B and 26-2A, 26-2B) and through the first and second upper passages (composed of the first and second upper passage portions 16-1A, 16-1B and 16-2A, 16-2B).

The wheel 40 shown in FIGS. 1-3 includes a central bore 41 (configured to fit around spindle 24) and multiple (e.g., 8) radially extending spokes 42 each having a semicircular indentation at a radial end thereof, with the spokes 42 being separated by recesses 44. In certain embodiments, the wheel 40 may be fabricated from multiple parts (such as discussed hereinafter in connection with FIG. 4).

In certain embodiments, the first and second complementary body portions 10, as well as the wheel 40 may be integrally formed from a polymeric and/or composite material (optionally incorporating reinforcing fibers) by techniques such as molding, machining, and/or three-dimensional printing. In certain embodiments, the foregoing elements may be fabricated of metal by casting, machining, or other additive or subtractive material processes.

Figure 4:
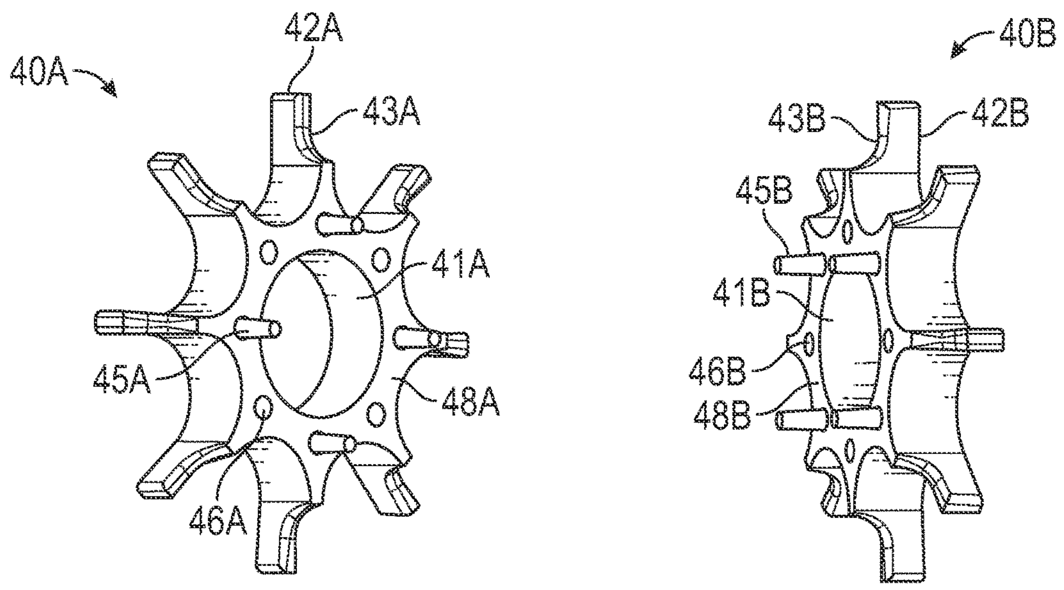
FIG. 4 is an exploded perspective view of the wheel of FIGS. 1-3, showing the wheel as comprising first and second wheel portions.

FIG. 4 is an exploded perspective view of the wheel of FIGS. 1-3, showing the wheel as comprising first and second wheel portions 40A, 40B. Each wheel portion 40A, 40B comprises a bore 41A, 41B and has multiple (e.g., eight) radially projecting spokes 42A, 42B, with each spoke 42A, 42B defining a curved indentation 43A, 43B. Each wheel portion 40A, 40B has a medial hub surface 48A, 48B that includes projections 45A, 45B and defines recesses 46A, 46B that are arranged to cooperate with one another to couple the wheel portions 40A, 40B to one another.

Figure 5:
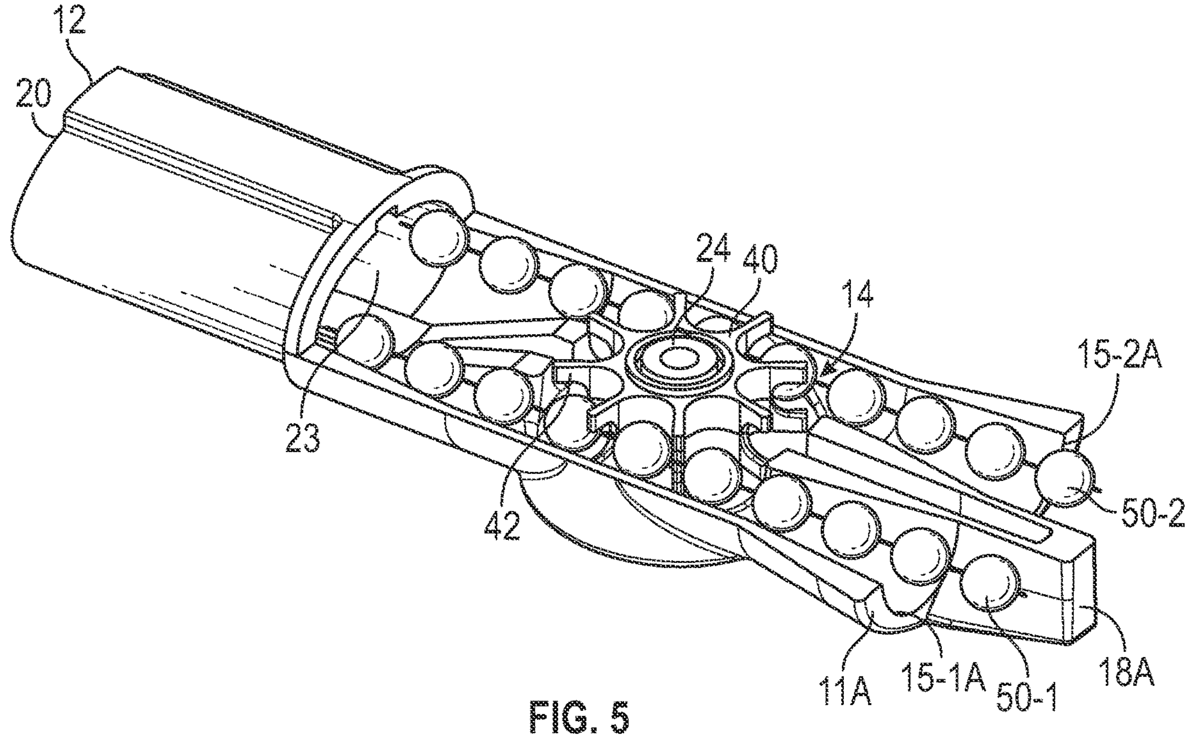
FIG. 5 is a perspective view of the first complementary body portion and wheel of FIG. 1, with the wheel received by the spindle of the first complementary body portion, and with segments of a bead-type lift chain segments received by the first complementary body portion and the wheel.
Figure 6A:
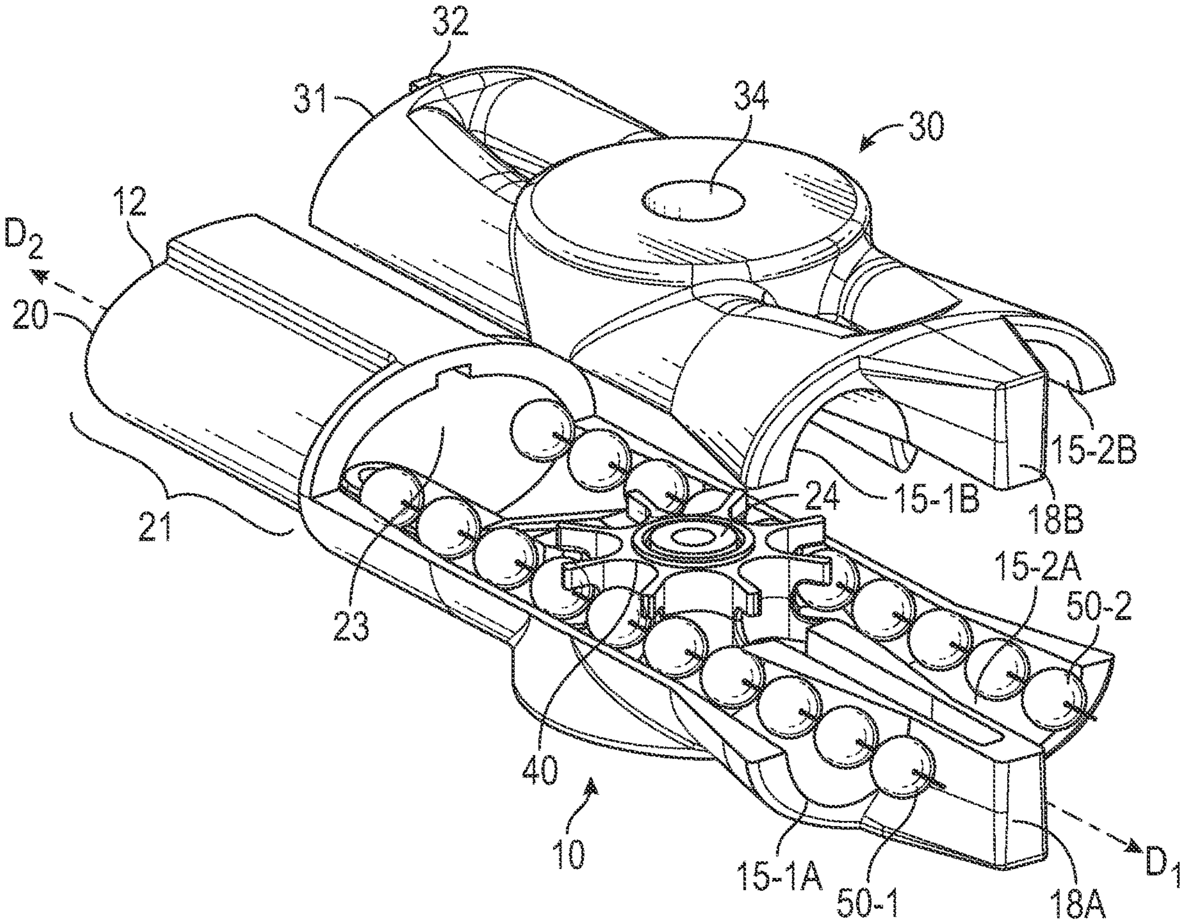
FIG. 6A is a partially exploded perspective view of the items shown in FIG. 5, with the second complementary body portion arranged above the wheel and the first complementary body portion.

FIG. 5 is a perspective view of the first complementary body portion 10 and wheel 40 of FIG. 1, with the wheel 40 received by the spindle 24 of the first complementary body portion 10, and with a first segment 50-1 and a second segment 50-2 of a bead-type lift chain received by the first complementary body portion 10 and the wheel 40. Although discrete segments 50-1, 50-2 of the bead-type lift chain are illustrated, it is to be appreciated that such segments 50-1, 50-2 would be part of a lift chain, and would extend beyond both ends 11A, 12 of the first complementary body portion according to embodiments disclosed herein. As shown, the first segment 50-1 extends through the first upper opening portion 15-1A, and the second segment 50-2 extends through the second upper opening portion 15-2A, with both segments 50-1, 50-2 extending through the internal r cavity 14 and being engaged with spokes of the wheel 50. FIG. 6A shows the items of FIG. 5, with the second complementary body portion 30 superimposed from above. FIG. 6A further includes directional arrows $D_1$ (representing an upward direction in use) and $D_2$ (representing a downward direction in use), with both direction arrows $D_1$, $D_2$ representing a longitudinal direction the assembly (and a potential directions of travel of the lift chain through the assembly) and both being orthogonal to the spindle 24.

Figure 6B:
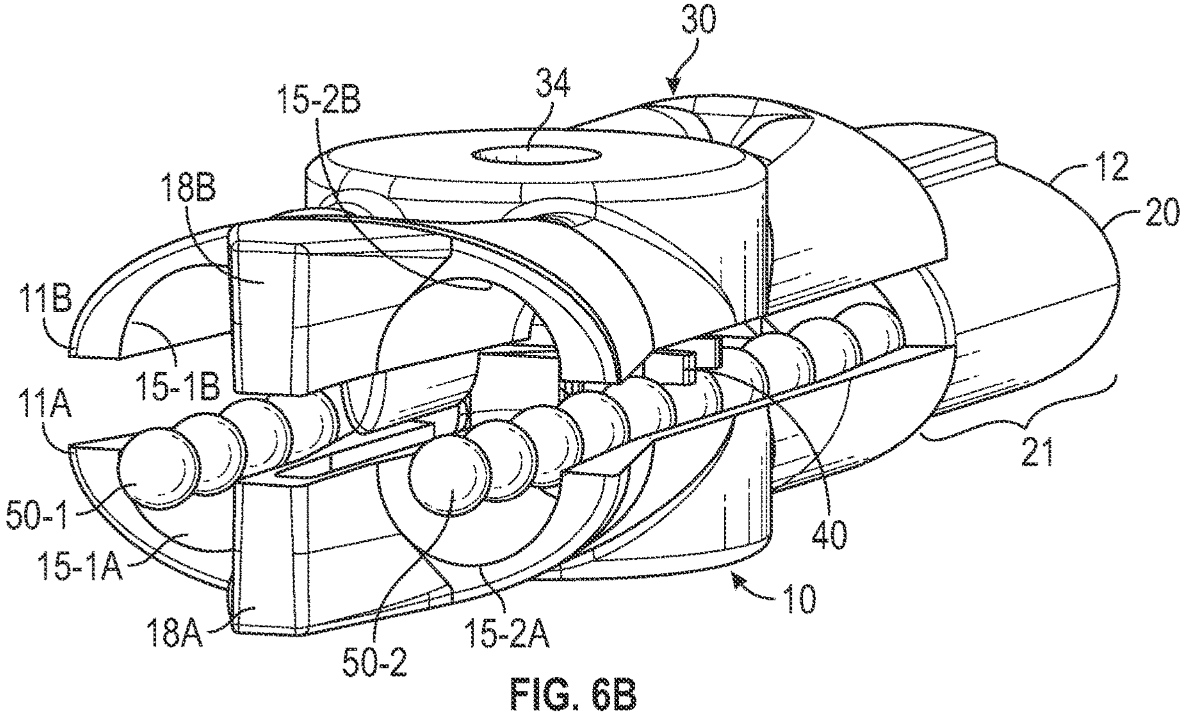
FIG. 6B is a partially exploded perspective view of the items shown in FIG. 6A, with top portions of the apparatus in the foreground.
Figure 6C:
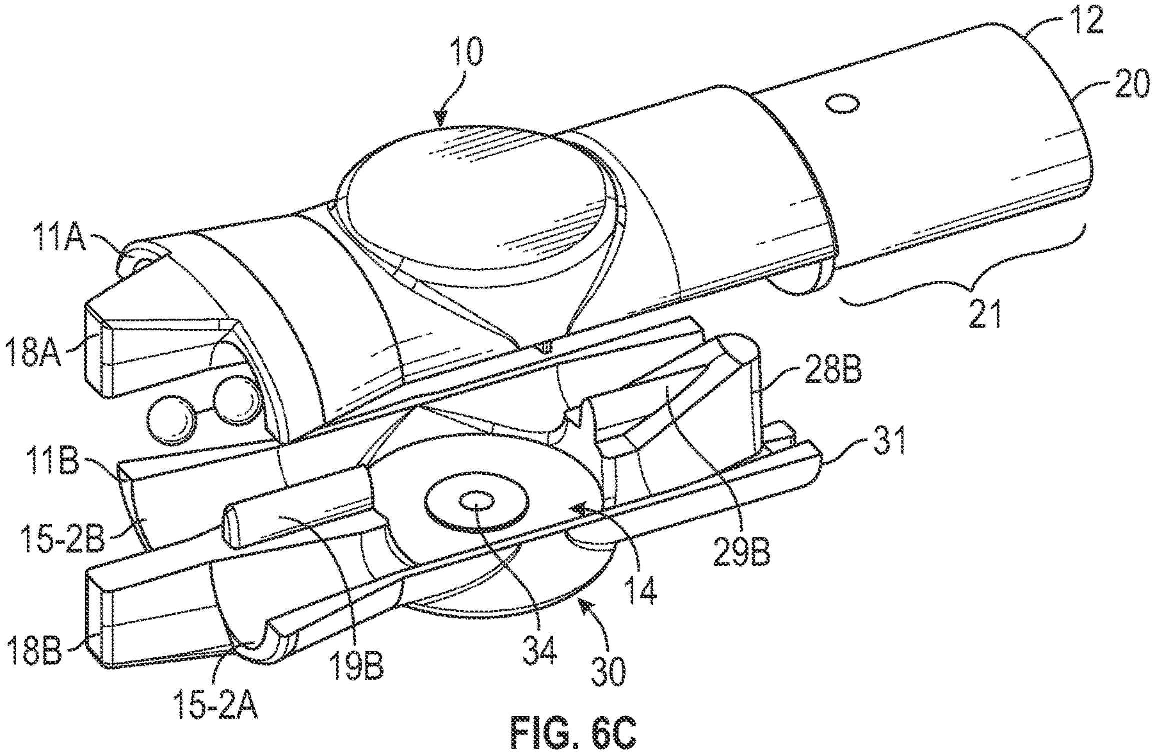
FIG. 6C is a partially exploded perspective view of the items shown in FIG. 6A, flipped upside-down relative to the view shown in FIG. 6A.
Figure 6D:
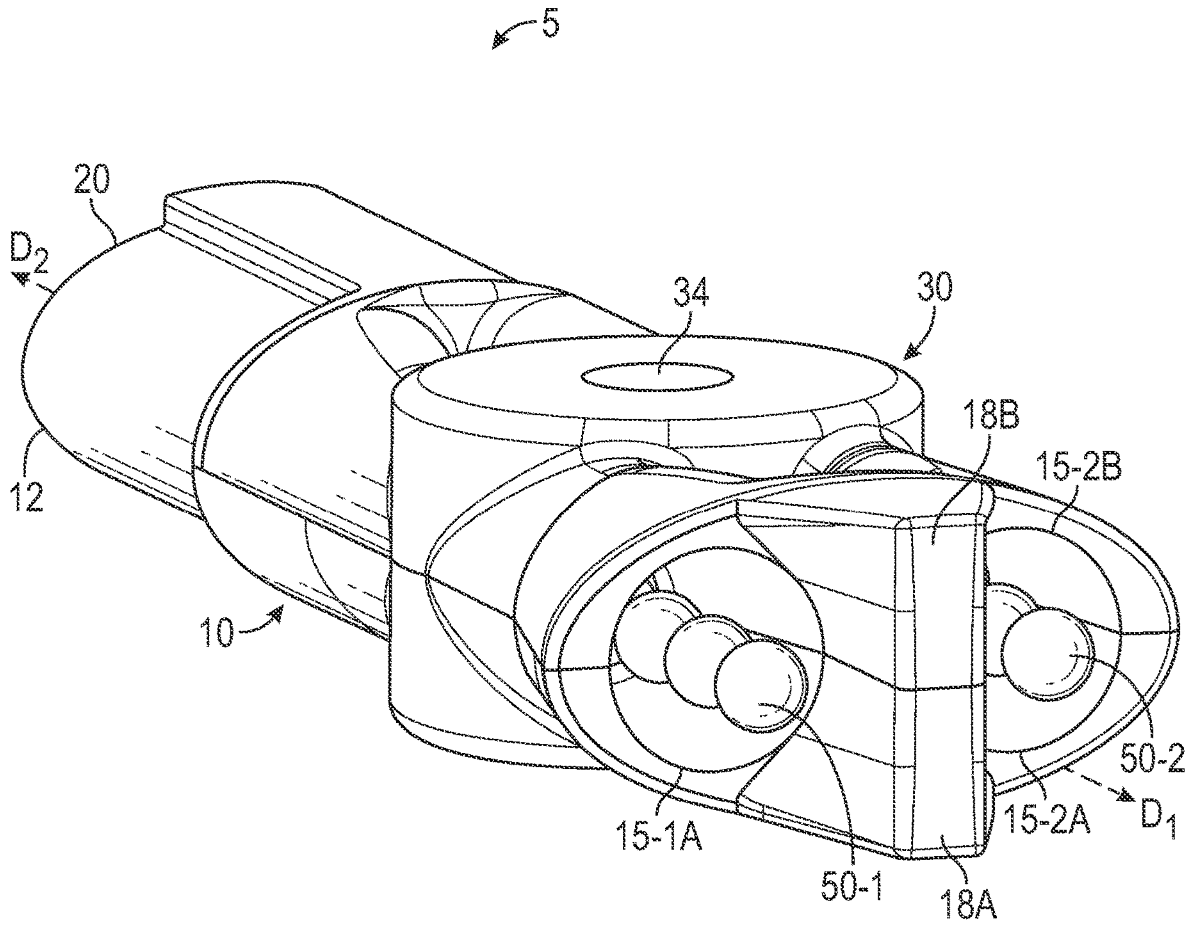
FIG. 6D is a perspective view of the items of FIGS. 6A-6C in assembled form, with top portions of the apparatus in the foreground.

Engagement between the wheel 40 and the lift chain is configured to allow free passage of the first and second segments 50-1, 50-2 through the internal cavity in opposing directions (e.g., simultaneous movement of the first segment 50-1 in the first direction $D_1$, and movement of the second segment 50-2 in the second direction $D_2$, or vice-versa). Such engagement is also configured to prevent free passage of the first and second segments 50-1, 50-2 through the internal cavity in the same direction (e.g., movement of both segments 50-1, 50-2 in the first direction $D_1$, or movement of both segments 50-1, 50-2 in the second direction $D_2$). FIGS. 6B-6C provide additional partially exploded perspective views of items of FIG. 6A. FIG. 6D is a perspective view of the items of FIGS. 6A-6C in assembled form (i.e., with the first and second complementary body portions coupled together, and with the wheel arranged therebetween) to form an apparatus 5, with top portions of the apparatus 5 shown in the foreground. All of the various elements of FIGS. 6A-6D have been described previously herein.

The apparatus 5 is configured to be placed at the top of a cord channel enclosure in order to guide passage of a lift cord or lift chain into and out of the cord channel enclosure, as part of a cod actuating assembly. Such a cord channel enclosure may include a slider moveably engaged thereto, with the slider being configured to selectively engage the lift cord or lift chain through a slot defined in the cord channel enclosure, so that a user can effectuate movement of the lift cord or lift chain without contacting the lift cord or lift chain. In certain embodiments, a loop of lift cord or lift chain is continuous. In certain embodiments, a loop of lift cord or lift chain is discontinuous, wherein ends of the lift cord or lift chain outside of a cord channel enclosure may be coupled to an intermediate member (e.g., a clutch assembly, a roller, or other moveable member of configured to move the architectural opening covering) to close the loop.

Figure 7:
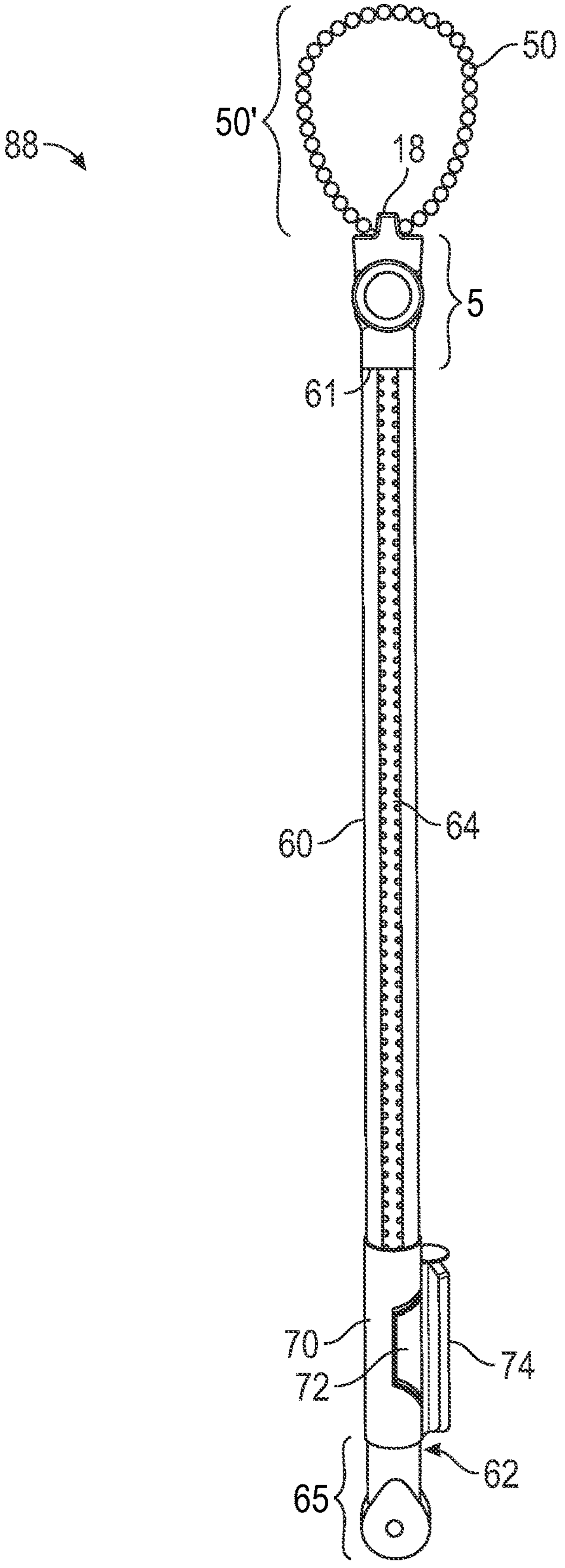
FIG. 7 is a side elevational view of a cord actuating assembly including the apparatus of FIG. 6D coupled to a top end of a cord channel enclosure having a slider moveably engaged thereto, with an end guide structure coupled to the lower end of the cord channel enclosure, and with a loop portion of a bead-type lift chain extending upward from the apparatus at the top end of the cord channel enclosure.
Figure 11:
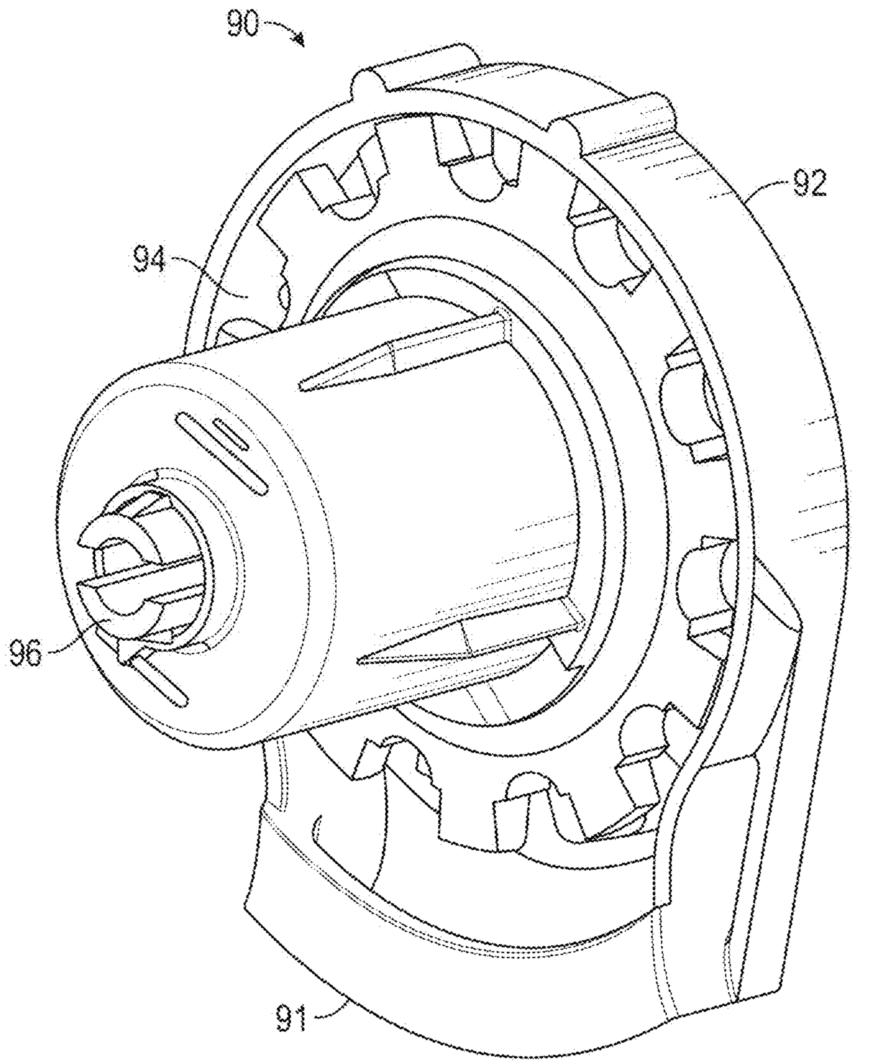
FIG. 11 (PRIOR ART)
FIG. 11 is a perspective view of a conventional clutch assembly configured to drive a roller to operate a cover for an architectural opening.

FIG. 7 is a side elevational view of a cord actuating assembly 88 including the apparatus 5 of FIG. 6D coupled to a top end 61 of a cord channel enclosure 60 having a slider 70 moveably engaged thereto, with an end guide structure 65 coupled to a lower end 62 of the cord channel enclosure 60. As shown, a continuous lift chain 50 (or lift cord in certain embodiments) is received by the cord actuating assembly 88 and extends through the apparatus 5, the cord channel enclosure 60, and the end guide structure 65, with a fixed length subloop 50' of the lift chain 50 extending upward beyond the apparatus past an upper medial guide member 18 thereof. The fixed length subloop 50' is suitable for mating with generic clutch assemblies (e.g., the clutch assembly 90 as shown in FIG. 11), wherein coupling between the loop 50 and the wheel (as illustrated and described previously herein) within the assembly 5 beneficially permits the subloop 50' to maintain its fixed length while simultaneously preventing slack from developing in the loop 50 within the cord channel enclosure 60 (and thereby preventing the loop 50 from being removed from an open slot 64 defined in the cord channel enclosure 60 The open slot 64 includes an open slot 64 that may extend the entire (or substantially the entire) height of the cord channel enclosure 60, wherein the open slot 64 permits coupling between the slider 70 and a cord engagement member 80 within an interior of the cord channel enclosure 60, while permitting the cord engagement member 64 and the slider 70 coupled thereto to translate relative to the cord channel enclosure 60. The slider 70 has an actuating member 72 coupled thereto, with an optional handle 74 coupled to the actuating member 72.

Figure 8:
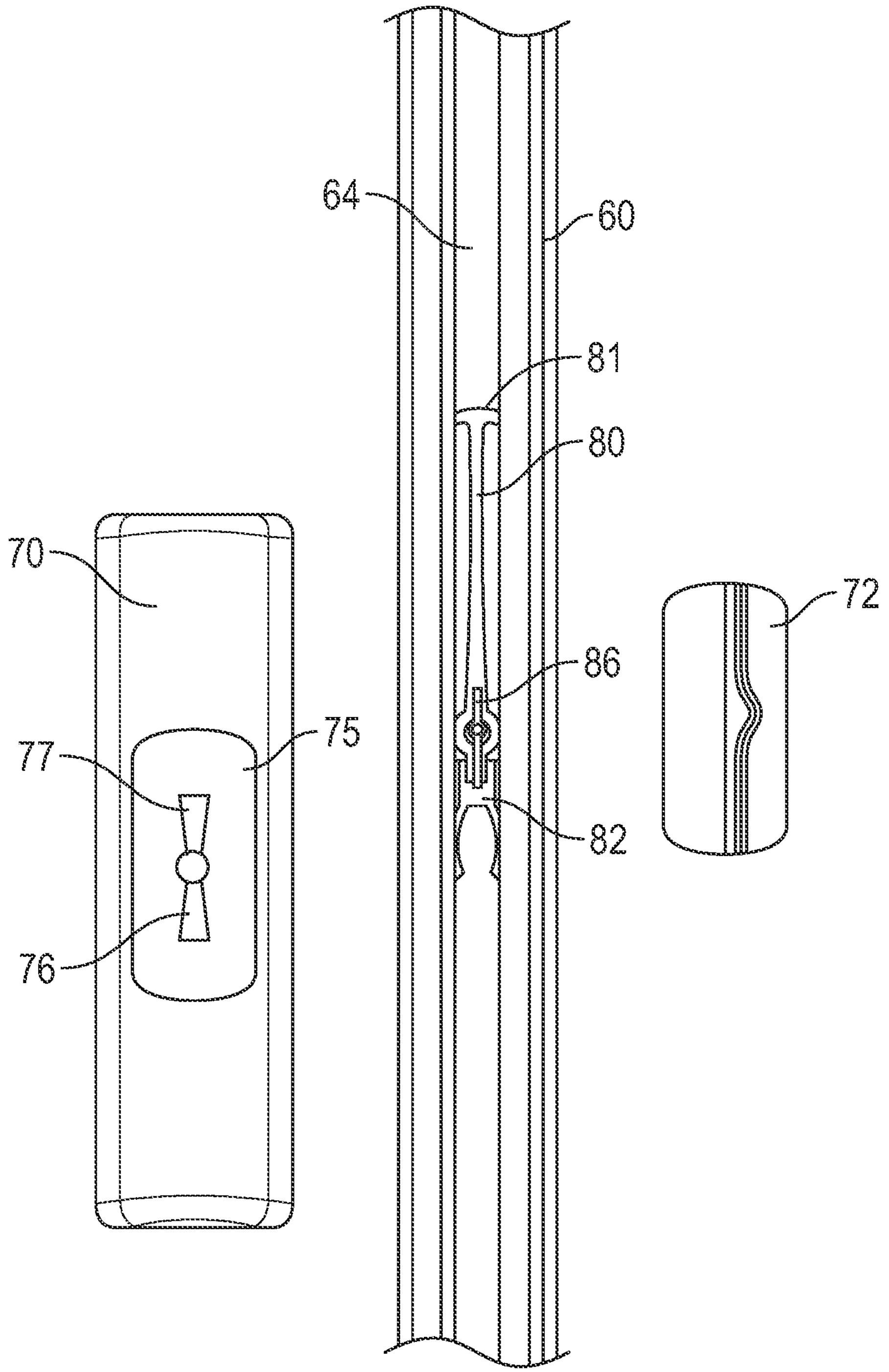
FIG. 8 is a front elevational, assembly view of a portion of a cord channel enclosure, slider, and actuating member, with a cord engagement mechanism arranged within the cord channel enclosure.

FIG. 8 is a front elevational assembly view of a portion of a cord channel enclosure 60, slider 70, and actuating member 72, with a cord engagement member 80 arranged within an interior of the cord channel enclosure 60. The slider 70 has a generally tubular shape and is configured to fit around an exterior of the cord channel enclosure 60. A depression 75 defined in the slider 70 defines opposing fan-shaped openings 76, 77. Turning members 86 project outward from the actuating member 72 through the open slot 64 and the fan-shaped openings 76, 77 to engage with the actuating member 72 arranged along an exterior of the cord channel enclosure 60 along the depression 75. The cord engagement member 80 includes an upper engagement end 81 having an anvil shape, and includes a disengagement component 84 having opposing elastic members 82, 83 (shown in FIG. 9), with the turning members 86 being arranged between the upper engagement end 193 and the turning members 86. If the actuating member 72 rotated or pivoted relative to the slider 70, then the turning members 86 affixed thereto will likewise pivot within the cord channel enclosure 60 (with angular range of travel limited to a few degrees by the fan-shaped openings 76, 77) to cause the upper engagement end 81 to engage with a lift cord or lift chain within one side of the cord channel enclosure 60. While this rotationally-initiated engagement is maintained by a user, the user may also move the slider 70 in an upward or downward direction to cause movement of the lift cord or lift chain within the cord channel enclosure 60. The disengagement component 84 including the opposing elastic members 82, 83 is configured to exert a restoring force that returns the upper engagement end 81 to a neutral (centered) position (i.e., so as not to engage a lift cord or lift chain within the cord channel enclosure 60). Although a simple actuating member 72 is shown, it is to be appreciated that such member 72 may be supplemented or replaced with a rocker-type member (not shown) configured to be grasped by a user along an upper portion or lower portion thereof to alter a direction of rotation of the cord engagement member 80. In use, a user may grasp the slider 70 and pivot the actuating element 72 to engage a lift cord or lift chain within the cord channel enclosure 60, and then move the slider 70 upward or downward as desired to cause the lift cord or lift chain to move in a desired direction. Upon release of the actuating element 72, the slider 70 may then be moved in an opposing direction and the above-described operation may be repeated any number of times as desired by a user in order to open or close a covering for an architectural opening by a desired amount.

Figure 9:
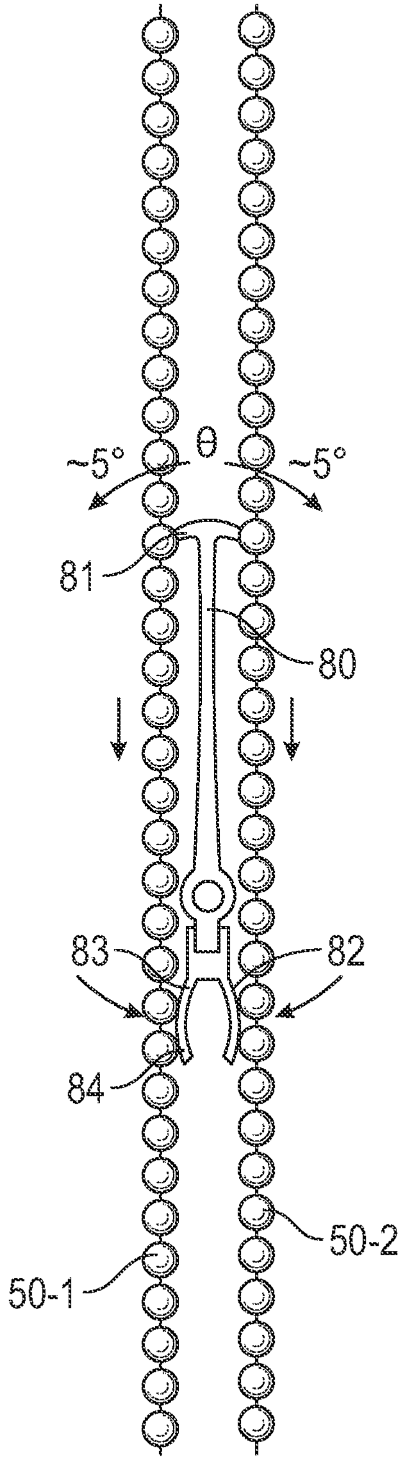
FIG. 9 is a front elevational view showing the cord engagement member of FIG. 8 arranged between first and second segments of a bead-type lift chain.

FIG. 9 is a front elevational view showing the cord engagement member 80 of FIG. 8 arranged between first and second segments 50-1, 50-2 of a bead-type lift chain. When an actuation member (e.g., 71 in FIG. 8) coupled to the cord engagement member 80 is actuated by a user, the cord engagement member 80 is configured to rotate or pivot by a limited angular range Θ (e.g., of up to about 5 degrees in either direction from vertical, for a total pivotal range of about 10 degrees) to cause the upper engagement end 81 to engage one of the first or the second segment 50-1, 50-2 so that the engaged segment 50-1, 50-2 may be moved in a desired direction (thereby causing the non-engagement segment to move in an opposing direction, since it is understood that the segments 50-1, 50-2 are part of a loop. When an actuation member is released by a user, a restoring force is exerted by one of the opposing elastic members 82, 83 of the disengagement component 84 (which may be part of, or coupled to, the cord engagement member 80) to disengage the upper engagement end 81 from either segment 50-1, 50-2.

Figure 10A:
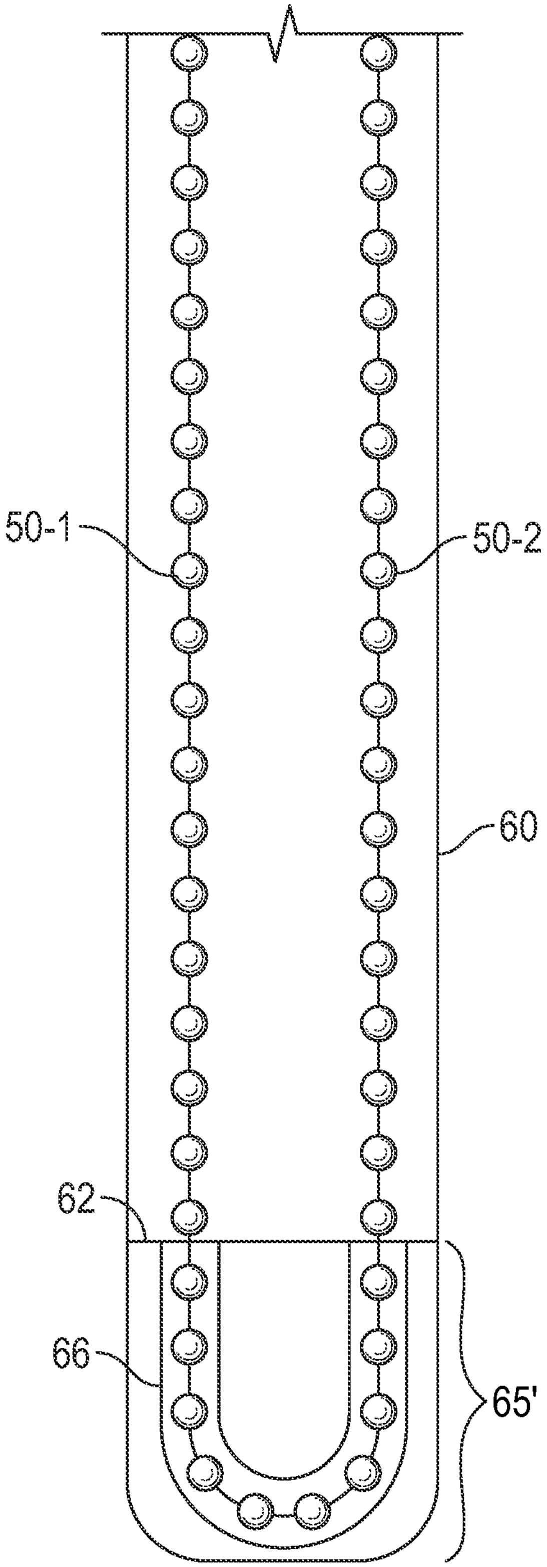
FIG. 10A is a simplified front cross-sectional view of a portion of a cord channel enclosure having an end guide structure affixed thereto, with a bead-type lift chain extending through the cord channel enclosure and end guide structure.
Figure 10B:
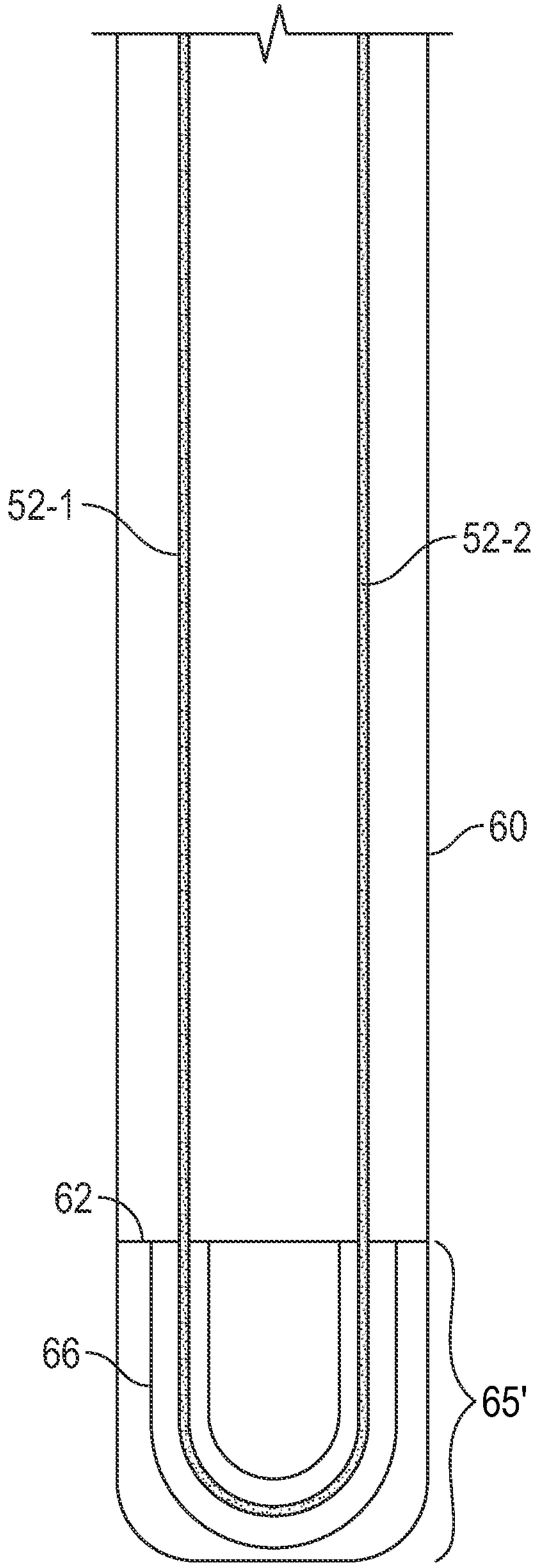
FIG. 10B is a simplified front cross-sectional view of a portion of a cord channel enclosure having an end guide structure affixed thereto, with a lift cord extending through the cord channel enclosure and end guide structure.

FIG. 10A is a simplified front cross-sectional view of a portion of a cord channel enclosure 60 having an end guide structure 65' affixed to a lower end 62 of the cord channel enclosure 60, with a bead-type lift chain (including lift chain segments 50-1, 50-2) extending through the cord channel enclosure 60 and the end guide structure 65'. In this simplified view, a slot-defining front wall of the cord channel enclosure 60 is not visible. The end guide structure 65' includes a curved channel 66, which may have a U-shape or other recurved shape, and that is configured to cooperate with a wheel (e.g., 40 in FIGS. 1-3) of an apparatus 5 for separating, controlling, and directing a lift cord or lift chain as described previously herein to retain the lift cord or lift chain in a cord channel enclosure. FIG. 10B is a simplified front cross-sectional view of a portion of the same cord channel enclosure 60 and end guide structure 65' of FIG. 10B, but containing segments 52-1, 52-2 of a continuous lift cord instead of a lift chain as illustrated in FIG. 10A.

FIG. 11 is a perspective view of a conventional clutch assembly 90 configured to drive a roller to operate a cover for an architectural opening. The clutch assembly 90 includes a curved casing 92 including a cord or chain path 94 configured to receive a loop of lift cord or lift chain. The clutch assembly 90 further includes a coupling 96 configured to engage a roller of a cover for an architectural opening.

Figure 12:
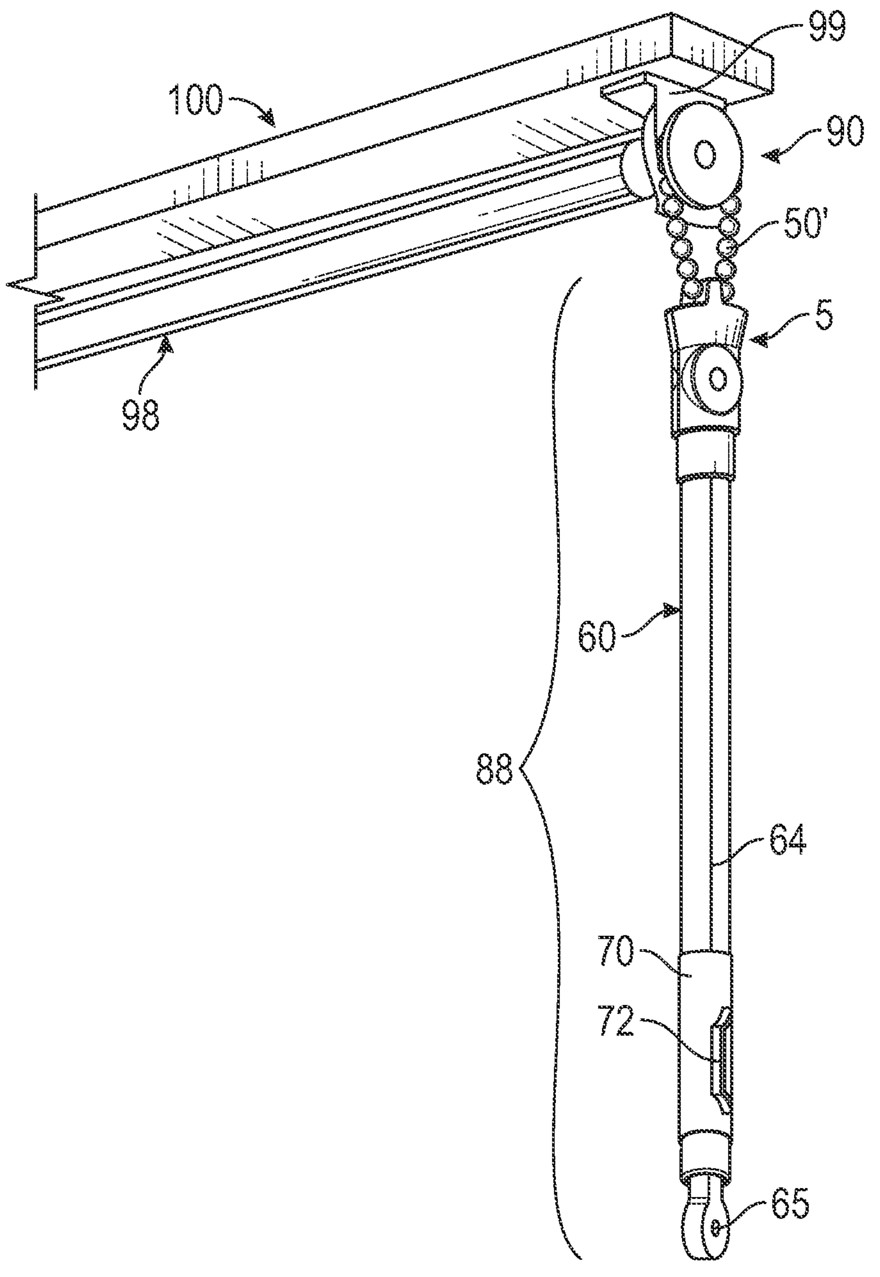
FIG. 12 is a perspective view of the cord actuating assembly of FIG. 7 being operatively coupled to a clutch assembly that is affixed to a frame of an architectural opening and that is configured to drive a roller to operate a cover for an architectural opening.

FIG. 12 is a perspective view of the cord actuating assembly 88 of FIG. 7 (incorporating the apparatus 5 of FIG. 6D coupled to a top end of a cord channel enclosure 60 having a slider 70 and actuating member 72 moveably engaged thereto, with an end guide structure 65 coupled to a lower end of the cord channel enclosure 60), with the cord actuating assembly 88 being operatively coupled (via fixed length subloop 50' of a lift chain or lift cord) to a clutch assembly 90. The clutch assembly 90 has an associated mounting element 90 affixed to a frame 100 of an architectural opening, and the clutch assembly 90 is configured to drive a roller 98 to operate a cover (not shown) for the architectural opening. The portion of the fixed length subloop 50' between the clutch assembly 90 and the apparatus 5 provides considerable operating freedom to a user seeking to raise or lower an architectural cover (not shown) borne by the roller 98, as the fixed length subloop 50' permits the cord channel enclosure 60 to be tilted along arcs in a multitude of different directions or planes. This same portion of the fixed length subloop 50' between the clutch assembly 90 and the apparatus 5 is subject to being twisted (e.g., by 90 degrees, 180 degrees, 360 degrees, 540 degrees, 720 degrees, or an angular range spanning any two of the foregoing endpoints) if a user should rotate the cord channel enclosure 60; however, the apparatus 5 is configured to maintain smooth operation of the cord actuating assembly 88 regardless of angular direction of the cord channel enclosure 60 and regardless of whether the fixed length subloop 50' may be twisted by 90 degrees, 180 degrees, 360 degrees, 540 degrees, 720 degrees, or an angular range spanning any two of the foregoing endpoints. As noted previously herein, the apparatus 5 includes a body structure having first and second upper openings that are separated by an upper medial guide member that protrudes beyond the upper openings, and the upper openings are sized and shaped to prevent binding of lift cords and lift chains, wherein the foregoing features ensure smooth passage of the cord actuating assembly 88 despite potential presence of twists in of the fixed length subloop 50' and regardless of position of the actuating assembly 88 relative to the clutch assembly 90.

Figure 13A:
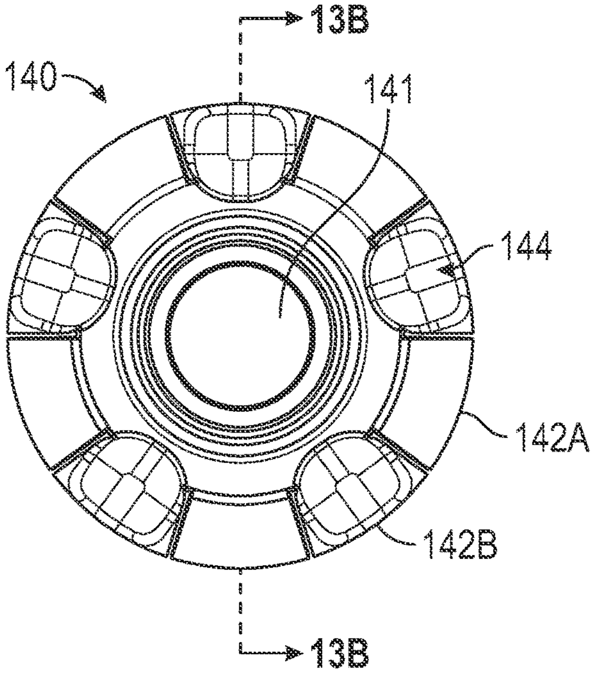
FIGS. 13A-13D provide front elevational, cross-sectional, side elevational, and perspective views of an alternative wheel suitable for use as part of an apparatus for separating, controlling, and directing a lift cord of an architectural opening covering according to one embodiment.
Figure 13B:
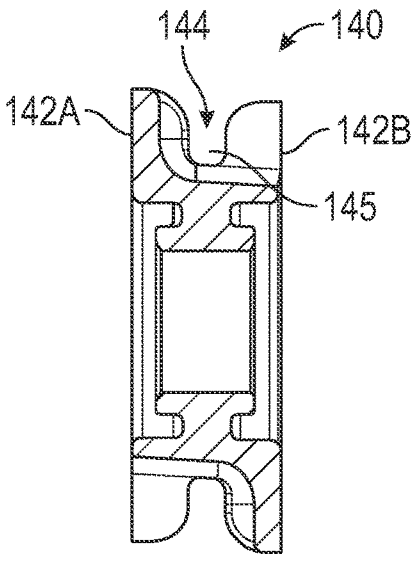
Figure 13C:
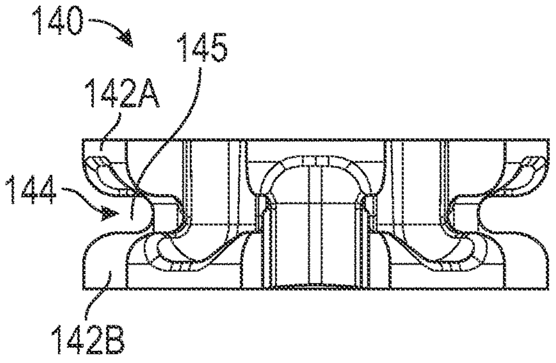
Figure 13D:
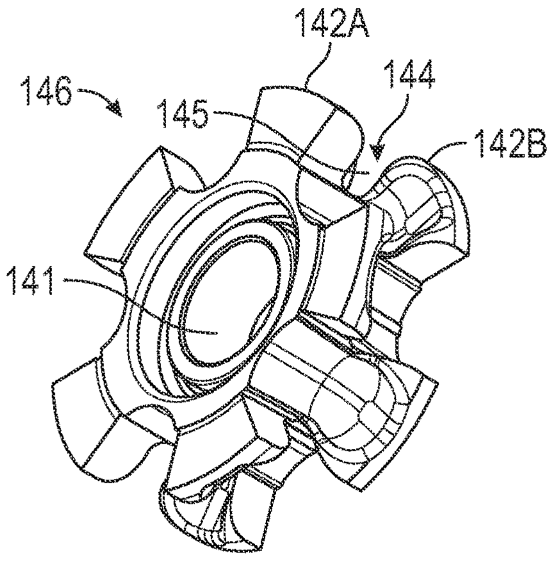

FIGS. 13A-13D illustrate a wheel 140 (which embodies an alternative to the wheel 40 illustrated and described previously) suitable for use as part of an apparatus for separating, controlling, and directing a lift cord of an architectural opening covering according to one embodiment. FIG. 13A is a front elevational view, FIG. 13B is a cross-sectional view, FIG. 13C is a side elevational view, and FIG. 13D is a perspective view of the wheel 140. The wheel 140 includes a central bore 141 and multiple (e.g., five) front radially projecting spokes 142A that are positionally offset relative to multiple (e.g., five) rear radially projecting spokes 1428. An inner face of each spoke 142A, 1428 bounds a recess 144 that spans between adjacent spokes of an opposing face of the wheel 140, wherein a total of ten such recesses 144 are provided. As shown in FIGS. 13B and 13C, a reduced depth region 145 is provided between each pair of adjacent recesses 144, wherein the reduced depth region 145 may beneficially engage a lift cord, or accommodate a reduced diameter portion of a lift chain (e.g., a bead-type lift chain). In this manner, the wheel 140 may be used with either a lift cord or a lift chain in an apparatus 5 for separating, controlling, and directing a lift cord or lift chain as described previously herein.

While specific aspects, features and illustrative embodiments have been disclosed herein, it will be appreciated that the disclosure extends to and encompasses numerous other variations, modifications, and alternative embodiments, as will suggest themselves to those of ordinary skill in the pertinent art, based on the disclosure herein. Various combinations and sub-combinations of the structures described herein are contemplated and will be apparent to a skilled person having knowledge of this disclosure. Any of the various features and elements as disclosed herein may be combined with one or more other disclosed features and elements unless indicated to the contrary herein. Correspondingly, the invention as hereinafter claimed is intended to be broadly construed and interpreted, as including all such variations, modifications and alternative embodiments, within its scope and including equivalents of the claims.

What is claimed is:

1. An apparatus for separating, controlling, and directing a lift cord or lift chain of an architectural opening covering, the apparatus comprising:

a primary body structure comprising first and second complementary body portions and comprising a central portion containing a rotatable wheel configured to engage the lift cord or lift chain, the lift cord or lift chain being configured as a loop, wherein:

the primary body structure defines first and second upper openings separated by an upper medial guide member including an upwardly protruding portion that protrudes upwardly beyond the first and second upper openings, and including a downwardly extending portion that extends downwardly from the first and second openings to the central portion, the primary body structure comprises an internal cavity including first and second upper passages that are frustoconical in shape and that are separated and partially bounded by the downwardly extending portion, with the first upper passage leading from the central portion to the first upper opening, and with the second upper passage leading from the central portion to the second upper opening, and the primary body structure comprises a lower opening, wherein the lower opening as well as the first and second upper openings are configured to permit passage of the lift cord or lift chain into and through the cavity;

the loop of the lift cord or lift chain comprises a first segment configured to travel through the first upper opening, and comprises a second segment configured to travel through the second upper opening; and engagement between the wheel and loop of the lift cord or lift chain is configured to allow free passage of the first and second segments through the cavity in opposing directions, and is configured to prevent free passage of the first and second segments through the cavity in the same direction.

2. The apparatus of claim 1, wherein:

the first upper passage has a first upper end coinciding with the first upper opening and having a first lower end proximate to the central portion, the first passage having a greater width at the first upper end than at the first lower end, with each of the first upper end and the first lower end having a circular cross-sectional shape; and the second upper passage has a second upper end coinciding with the second upper opening and having a second lower end proximate to the central portion, the second passage having a greater width at the second upper end than at the second lower end, with each of the second upper end and the second lower end having a circular cross-sectional shape.

3. The apparatus of claim 2, wherein:

the width of the first upper passage is at least 10% greater at the first upper end than at the first lower end; and the width of the second upper passage is at least 10% greater at the second upper end than at the second lower end.

4. The apparatus of claim 2, wherein:

the width of the first upper passage at the first upper end is at least 10% greater than a maximum width of loop of lift cord or lift chain; and the width of the second upper passage at the second upper end is at least 10% greater than a maximum width of the loop of lift cord or lift chain.

5. The apparatus of claim 2, wherein:

the width of the first upper passage at the first upper end is at least 50% greater than a maximum width of loop of lift cord or lift chain; and the width of the second upper passage at the second upper end is at least 50% greater than a maximum width of the loop of lift cord or lift chain.

6. The apparatus of claim 1, wherein:

the lift cord or lift chain comprises a bead chain; and the wheel comprises a plurality of recesses, and each recess of the plurality of recesses is configured to receive a corresponding individual bead of the bead chain.

7. The apparatus of claim 1, wherein:

the lift cord or lift chain comprises a straight cord; and the wheel comprises at least one recess configured to grasp the straight cord.

8. The apparatus of claim 1, wherein the upper medial guide member comprises a width that decreases with distance away from the first and second upper openings.

9. The apparatus of claim 1, wherein the upper medial guide member protrudes upwardly beyond the first and second upper openings by a distance at least as large as a width of either one of the first upper opening or the second upper opening.

10. The apparatus of claim 1, wherein the upper medial guide member protrudes upwardly beyond the first and second upper openings by a distance of at least 2 mm.

11. The apparatus of claim 1, wherein:

the first complementary body portion defines a first portion of the upper medial guide member, and the second complementary body portion defines a second portion of the upper medial guide member.

12. The apparatus of claim 1, wherein a lower portion of the primary body structure comprises a tubular body portion.

13. The apparatus of claim 1, wherein each of the first and second complementary body portions is integrally formed from a polymeric material.

14. The apparatus of claim 1, wherein a length of the downwardly extending portion of the upper medial guide member is at least as large as a length of the upwardly protruding portion of the upper medial guide member.

15. The apparatus of claim 1, wherein the primary body structure comprises a spindle on which the wheel is configured to rotate, the spindle being arranged in a central portion of the internal cavity, and the spindle being oriented non-parallel to a direction of travel of lift cord or lift chain within the primary body structure.

16. The apparatus of claim 15, wherein the spindle comprises a bore configured to receive a connector arranged to join the first and second complementary body portions to one another.

17. The apparatus of claim 1, wherein the primary body structure further comprises a lower medial guide member arranged between the central portion of the internal cavity and the lower opening, wherein the lower medial guide member locally separates the internal cavity into two laterally separated lower passages.

18. The apparatus of claim 17, wherein the two laterally separated lower passages each have a width that increases with distance away from the central portion of the internal cavity.

19. The apparatus of claim 17, wherein:

the first complementary body portion defines a first portion of the lower medial guide member, and the second complementary body portion defines a second portion of the lower medial guide member.

20. The apparatus of claim 1, further comprising:

a cord channel enclosure coupled to a lower end of the primary body structure and comprising an open slot, wherein the loop of lift cord or lift chain is further configured to travel through an interior of the cord channel enclosure;

a slider moveably engaged to the cord channel enclosure via the open slot and coupled to the loop of lift cord or lift chain, wherein movement of the slider facilitates movement of the first and second segments through the cord channel enclosure and through the cavity of the primary body structure; and an end guide structure coupled to a lower end of the cord channel enclosure, the end guide structure comprising a U-shaped channel through which the loop of lift cord or lift chain is configured to travel for passage to and from the cord channel enclosure.

21. The apparatus of claim 20, wherein the loop of lift cord or lift chain is continuous.

22. The apparatus of claim 21, wherein:

an upper portion of the continuous loop of lift cord or lift chain forms a fixed length subloop extending above the first and second upper openings;

a lower portion of the continuous loop of lift cord or lift chain extends through the primary body structure, the cord channel enclosure, and the end guide structure; and the lower portion of the continuous loop or of lift cord or lift chain is tensioned by the wheel to prevent removal of the lift cord or lift chain through the open slot of the cord channel enclosure.

23. The apparatus of claim 22, wherein the fixed length subloop is configured to engage a clutch assembly couplable to a roller of the architectural opening covering.

24. The apparatus of claim 20, wherein the loop of lift cord or lift chain is discontinuous and comprises two ends joined to a clutch assembly or a roller, with the clutch assembly or roller being configured to move the architectural opening covering.

* * * * *